June 29, 1926.

J. ROAT

POULTRY FEEDER

Filed March 30, 1926

1,590,909

WITNESSES
Edw. Thorpe
Franklin J. Foster

INVENTOR
James Roat
BY
ATTORNEYS.

Patented June 29, 1926.

1,590,909

UNITED STATES PATENT OFFICE.

JAMES ROAT, OF CANANDAIGUA, NEW YORK.

POULTRY FEEDER.

Application filed March 30, 1926. Serial No. 98,540.

An object of the present invention is to provide a poultry feeding device which will assure the exercising of the poultry during the time that they are feeding.

A further object of the invention is to provide a poultry feeder in which the distribution of feed from a hopper is effected by the activities of the poultry under the hopper, and in which the rate of distribution of the feed may be regulated.

Further objects of the invention are to provide a poultry feeder of simple, practical construction, which will be rugged and durable in use, and which may be manufactured with comparative economy.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Figure 1:
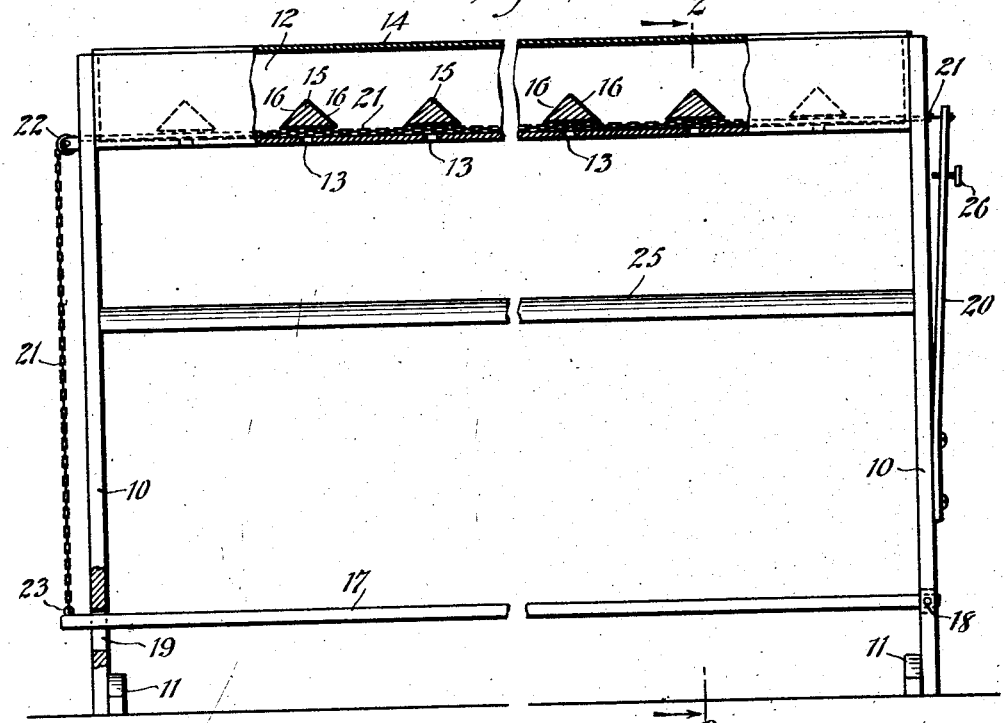
Fig. 1 is a broken view in side elevation of my improved poultry feeder, parts of the hopper and one of the standards being broken away and in section for the sake of clearness.
Figure 2:
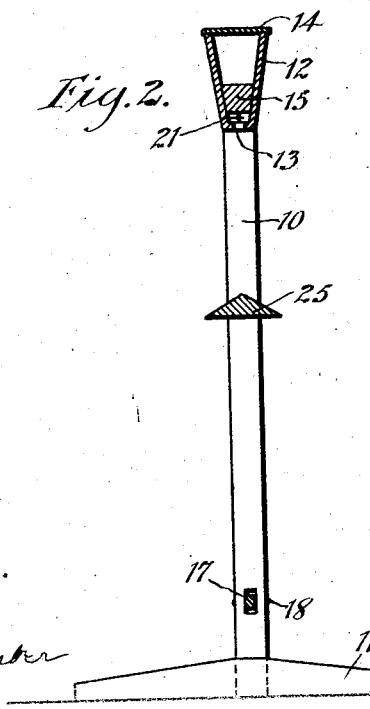
Fig. 2 is a vertical sectional view on the line 2—2 of Fig. 1.

The poultry feeder may be of any desired length in accordance with the size of the flock to be fed, and includes any suitable number of vertical standards 10 supported upon feet or bases 11. The upper ends of the standards 10 mount a hopper 12 having a series of openings 13 in its bottom for the discharge of feed. The hopper may be provided with a cover 14, and fitted over the openings are a number of generally triangular tapered blocks 15. These blocks are wedged between the tapering walls of the hopper and serve to prevent a direct and continuous flow of feed through the opening 13.

As seen in Fig. 1 the blocks are of triangular cross section, presenting a pair of feed deflecting surfaces 16, so that no feed will lodge on the blocks. Means is provided whereby the activities of the poultry to be fed will control the distribution or discharge of feed through the openings 13. I have shown one convenient mechanism for accomplishing this purpose which includes the use of a relatively light lever 17 pivoted at 18 in one of the standards 10 and having its free end working through a slot or slots 19 in the other standard or standards as the case may be. To the outer face of the end standard 10 to which the lever is pivotally connected, I secure the lower end of a light flat spring 20. The upper end of this spring is anchored to a drag which may be in the nature of a chain 21 extending across the bottom of the hopper 12, under the blocks 15, run over a pulley 22 on the other end standard, and anchored to the free end of the lever 17 at 23.

It will thus be seen that the weight of a hen on the lever 17 will depress the lever and drag the chain 21 in one direction across the bottom of the hopper under the blocks 15. This movement of the chain will cause a small amount of feed to be moved over the openings 13 through which the feed will gravitationally drop. When the lever 17 is relieved of the weight of the hen, spring 20 will restore the chain to its original position, causing a further discharge of feed through the openings 13 in the manner above described.

Preferably the feeder is used in the scratching shed, and surrounded by a considerable quantity of litter. The feed dropping through the openings 13 strikes a deflector or spreader plate 25 mounted between the standards 10 and distributes the grain through the litter. The poultry will thus be kept busy and active while feeding and will be thoroughly exercised.

It will be understood that while I have shown the use of a chain 21 as a drag member, and shall mention the chain in the following claims, I intend to cover the use of any drag member which is the equivalent of a chain or which will serve the same function. Any suitable means may be utilized for regulating the movement of the lever 17 and consequently the distance through which the chain 21 is dragged. I have shown one convenient means in the nature of an adjustable stop screw 26 mounted near the free end of the spring 20 to engage the standard which carries the spring.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:—

1. A poultry feeder including a hopper supported above the ground and having openings in its bottom, means preventing the direct flow of feed through the openings, a drag member on the floor of the hopper inoperative to close said openings and means controlled by movement of the poultry for reciprocating the drag member across the floor of the hopper to move small quantities of feed into alignment with the openings.

2. A poultry feeder including a hopper supported above the ground and having openings in its bottom, means preventing the direct flow of feed through the openings, a drag member on the floor of the hopper and means controlled by movement of the poultry for reciprocating the drag member across the floor of the hopper to move small quantities of feed into alignment with the openings, said drag member comprising a chain.

JAMES ROAT.